US012602722B2

(12) United States Patent
Terasawa et al.

(10) Patent No.: US 12,602,722 B2
(45) Date of Patent: Apr. 14, 2026

(54) VEHICLE MANAGEMENT METHOD AND SERVER

(71) Applicant: TOYOTA JIDOSHA KABUSHIKI KAISHA, Toyota (JP)

(72) Inventors: Yuko Terasawa, Tokyo-to (JP); Makoto Kakuchi, Toyota (JP); Toshiaki Karasawa, Tokyo-to (JP); Takeshi Higashi, Nagoya (JP); Yoshihiko Endo, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 146 days.

(21) Appl. No.: 18/545,394

(22) Filed: Dec. 19, 2023

(65) Prior Publication Data

US 2024/0212036 A1     Jun. 27, 2024

(30) Foreign Application Priority Data

Dec. 27, 2022     (JP) ................................ 2022-210086

(51) Int. Cl.
*G06Q 30/0645*     (2023.01)
*G06Q 50/06*     (2024.01)

(52) U.S. Cl.
CPC ......... *G06Q 30/0645* (2013.01); *G06Q 50/06* (2013.01)

(58) Field of Classification Search
CPC ... G06Q 30/0645; G06Q 50/06; G06Q 10/063
See application file for complete search history.

(56) References Cited

U.S. PATENT DOCUMENTS

| | | | |
|---|---|---|---|
| 2017/0263984 A1* | 9/2017 | Fujita ................... | G01R 31/392 |
| 2019/0139130 A1* | 5/2019 | Onodera ............ | G06Q 30/0284 |
| 2019/0156408 A1* | 5/2019 | Igata .................. | G06Q 30/0645 |
| 2019/0156409 A1* | 5/2019 | Igata ...................... | B60L 53/11 |
| 2020/0334722 A1 | 10/2020 | Kurimoto et al. | |
| 2021/0339650 A1* | 11/2021 | Hashimoto ............. | B60L 50/60 |
| 2023/0360116 A1* | 11/2023 | Shoji ...................... | B60L 58/16 |

FOREIGN PATENT DOCUMENTS

| | | | |
|---|---|---|---|
| JP | 2013084199 A | * 5/2013 | |
| JP | 2020-177652 A | 10/2020 | |
| WO | WO-2011160258 A1 | * 12/2011 | ............... B60L 3/12 |

OTHER PUBLICATIONS

"Sensor Fusion Techniques—How to combine the output of multiple sensors" (Year: 2019).*

* cited by examiner

*Primary Examiner* — Dennis W Ruhl
(74) *Attorney, Agent, or Firm* — Sughrue Mion, PLLC

(57)     ABSTRACT

A vehicle management method for managing a power storage device included in a vehicle includes: determining a first fee commensurate with a first degree of degradation of the power storage device evaluated in an evaluation period by a first method; determining a second fee commensurate with a second degree of evaluation, when obtaining the second degree of degradation of the power storage device evaluated in the evaluation period by a second method with a higher measurement accuracy than the first method; determining the second fee as a lease fee for a lease period, when the second fee is lower than the first fee; and determining the first fee as a lease fee for the lease period, when the second degree of degradation evaluated in and before the evaluation period is not obtained.

2 Claims, 5 Drawing Sheets

VEHICLE MANAGEMENT METHOD AND SERVER

This nonprovisional application is based on Japanese Patent Application No. 2022-210086 filed on Dec. 27, 2022 with the Japan Patent Office, the entire contents of which are hereby incorporated by reference.

BACKGROUND

Field

The present disclosure relates to a vehicle management method and a server.

Description of the Background Art

Japanese Patent Laying-Open No. 2020-177652 discloses a technique in which a server that manages a rental fee paid by a user for lending a running battery mounted on a vehicle collects a full charge capacity of the battery from the vehicle and lowers the rental fee as the collected full charge capacity decreases.

SUMMARY

In the vehicle management method described in Japanese Patent Laying-Open No. 2020-177652, the lease fee (rental fee) decreases as the full charge capacity of the power storage device (battery) decreases. This makes it possible to determine the lease fee for the power storage device in consideration of the degradation of the power storage device. However, in the vehicle management method, the lease fee is not necessarily calculated based on the degree of degradation measured with high accuracy (more specifically, the full charge capacity corresponding to the degree of degradation). When the accuracy of measuring the degree of degradation of the power storage device is low, a lease fee higher than a lease fee commensurate with the actual degree of degradation of the power storage device may be determined and the user may be notified of the determined lease fee.

The present disclosure is made to solve the above problem, and it is an object of the present disclosure to prevent a user from being notified of a lease fee higher than a lease fee commensurate with an actual degree of degradation, in a fee system for determining a lease fee using the degree of degradation of a power storage device.

According to a first aspect of the present disclosure, there is provided a vehicle management method including the following processes A to D. In the process A, a first degree of degradation of a power storage device included in a vehicle is obtained. The first degree of degradation is measured by a first method. In the process B, when the vehicle visits a predetermined location, a second degree of degradation of the power storage device is obtained. The second degree of degradation is measured at the predetermined location by a second method with a higher measurement accuracy than the first method. In the process C, a lease fee for the power storage device for a lease period is determined, using a degree of degradation of the power storage device evaluated in an evaluation period specified to precede the lease period. In the process D, a user of the vehicle is notified of the determined lease fee. The process C includes the following processes C-1 to C-4. In the process C-1, a first fee is determined that is commensurate with the first degree of degradation evaluated in the evaluation period by the first method. In the process C-2, when the second degree of degradation evaluated in the evaluation period by the second method is obtained, a second fee commensurate with the second degree of degradation is determined. In the process C-3, when the second fee is lower than the first fee, the second fee is determined as the lease fee for the lease period. In the process C-4, when the second degree of degradation evaluated in and before the evaluation period is not obtained, the first fee is determined as the lease fee for the lease period.

It is technically and economically difficult to implement a system that measures the degree of degradation of a power storage device mounted on a vehicle with high accuracy at all times. According to the above method, basically the first fee commensurate with the first degree of degradation evaluated by the first method is determined as a lease fee, and the user of the vehicle is notified of the determined lease fee. However, when the second degree of degradation evaluated by the second method is obtained and the second fee commensurate with the second degree of degradation is lower than the first fee, the second fee is determined as the lease fee and the user of the vehicle is notified of the determined lease fee. According to this method, the user can be notified of the first fee as the lease fee, regardless of whether or not evaluation by the second method is made. When the second degree of degradation closer to the actual degree of degradation than the first degree of degradation is evaluated by the second method, the user can be notified of the second fee as the lease fee. Therefore, according to the above method, in the fee system for determining the lease fee using the degree of degradation of the power storage device, it is possible to prevent the user from being notified of the lease fee higher than the lease fee commensurate with the actual degree of degradation. When the second degree of degradation evaluated by the second method in the evaluation period is obtained and the second fee commensurate with the second degree of degradation is higher than the first fee, the second fee may also be determined as the lease fee and the user of the vehicle may be notified of the determined lease fee.

According to a second aspect of the present disclosure, there is provided a server including: a processor; and a storage device storing a program that causes the processor to perform the vehicle management method described above. With such a server, the above-described vehicle management method is performed appropriately.

The vehicle may be an electrically powered vehicle (xEV) that utilizes electric power as the whole or a part of a power source. Examples of the xEV include battery electric vehicle (BEV), plug-in hybrid electric vehicle (PHEV), hybrid electric vehicle (HEV), and fuel cell electric vehicle (FCEV).

The foregoing and other objects, features, aspects and advantages of the present disclosure will become more apparent from the following detailed description of the present disclosure when taken in conjunction with the accompanying drawings.

Figure 1:
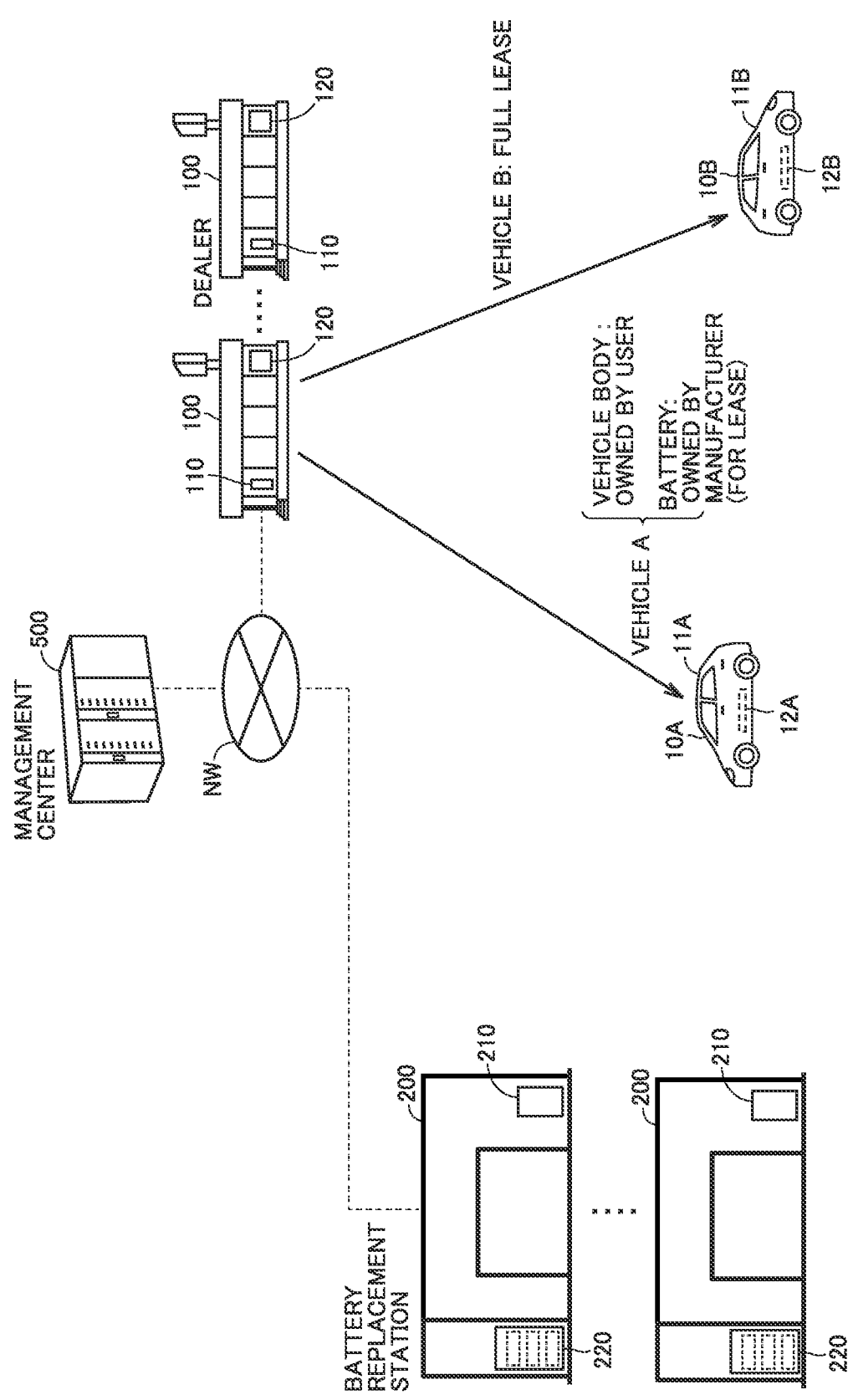
FIG. 1 is a diagram illustrating an outline of a vehicle management system according to an embodiment of the present disclosure.

DESCRIPTION OF THE PREFERRED
EMBODIMENTS

Embodiments of the present disclosure will be described in detail with reference to the drawings. In the drawings, the same or corresponding parts are denoted by the same reference numerals, and the description thereof will not be repeated.

FIG. 1 is a diagram illustrating an outline of a management system of a power storage device according to an embodiment. The management system includes a dealer 100, a battery replacement station (hereinafter referred to as "BSta") 200, and a management center 500. The dealer 100 includes a server 110 and a measuring device 120. The BSta 200 includes a server 210 and a measuring device 220. In this embodiment, a plurality of dealers 100 and a plurality of BStas 200 are installed so as to cover the entire jurisdiction area of the management system of the power storage device. The BSta 200 is configured to replace a power storage device for a vehicle. In this embodiment, a secondary battery is adopted as the power storage device. Note that the power storage device may be any device as long as it can store power. The management center 500, the server 110 at each base, and the server 210 at each base are configured to be able to communicate with each other via the communication network NW. The communication network NW is, for example, a wide area network constructed by the Internet and a radio base station.

The management center 500 is a server that provides a lease service for lending a vehicle power storage device. The management center 500 manages information on lease services. The management center 500 belongs to, for example, an automobile manufacturer. In this embodiment, the automobile manufacturer also serves as a lease provider.

The automobile manufacturer provides the vehicle manufactured by the automobile manufacturer to a customer (vehicle user) through the dealer 100. For example, the power storage device 12A of the vehicle 10A (vehicle A) shown in FIG. 1 may be lent to the user by the partial lease system. In the vehicle A (partial lease vehicle), the vehicle body 11A is owned by the user, and the power storage device 12A is owned by the automobile manufacturer. Further, the vehicle 10B (vehicle B) shown in FIG. 1 may be lent to the user by the full lease system. In the vehicle B (full lease vehicle), the whole vehicle (the vehicle body 11B and the power storage device 12B) is owned by the automobile manufacturer.

Figure 2:
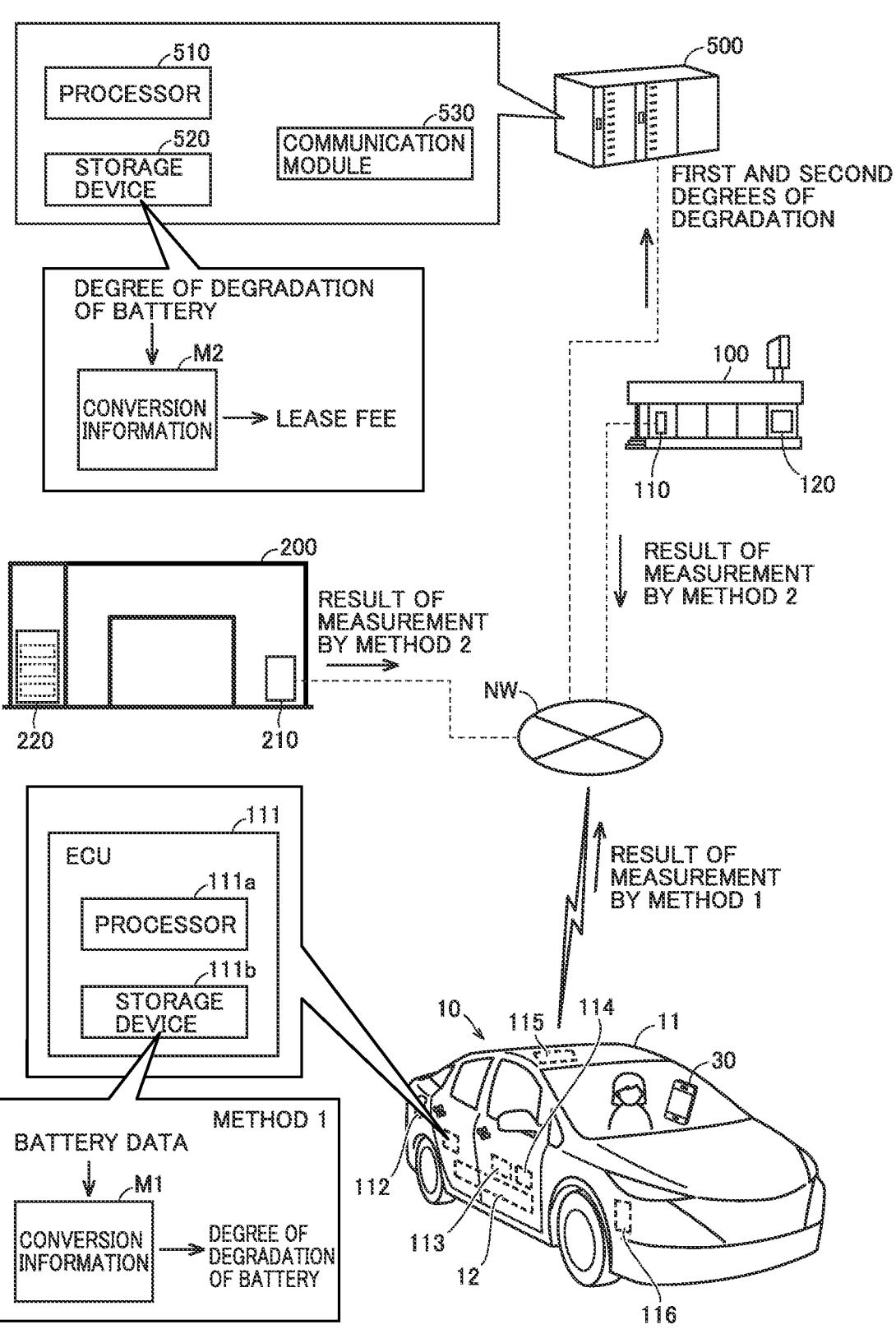
FIG. 2 is a diagram for explaining a method (first and second methods) for measuring a degree of degradation of a power storage device for a vehicle.

Hereinafter, the vehicle provided by the dealer 100 may be referred to as a "vehicle 10". The vehicle 10 according to this embodiment is one of the vehicles A and B shown in FIG. 1. FIG. 2 is a diagram illustrating a configuration of a vehicle 10 and a method of measuring a degree of degradation of a power storage device mounted on the vehicle 10.

Referring to FIG. 2, vehicle 10 includes a vehicle body 11 and a battery 12 mounted on vehicle body 11. The vehicle 10 may be a BEV having no internal combustion engine or a PHEV having an internal combustion engine. As the battery 12, a well-known power storage device for a vehicle (e.g., a lithium ion secondary battery or a nickel hydrogen secondary battery) can be adopted. A plurality of secondary batteries may form a battery pack. The battery 12 corresponds to an example of the "power storage device" according to the present disclosure.

The vehicle body 11 includes ECU (Electronic Control Unit) 111, an inlet 112, a charge/discharge circuit 113, BMS (Battery Management System) 114, a communication device 115, and a drive device 116. The vehicle body 11 may further include an HMI (Human Machine Interface) (not shown). The communication device 115 includes a communication I/F (interface) for communicating with a device outside the vehicle (for example, the management center 500). The communication device 115 is configured to be able to access the communication network NW by wireless communication.

The drive device 116 includes an MG (Motor Generator) and a circuit (PCU: Power Control Unit) for driving the MG. The MG functions as a traveling motor of the vehicle 10. The MG is driven by the PCU to rotate the drive wheels of the vehicle 10. The MG performs regenerative power generation during braking (deceleration) of the vehicle 10, and outputs the generated power to the battery 12.

The mobile terminal 30 is carried and operated by a user of the vehicle 10. In this embodiment, a smartphone having a touch panel display is adopted as the mobile terminal 30. The smartphone incorporates a computer and has a speaker function. The identification information (terminal ID) of the mobile terminal 30 is registered in the management center 500 in association with the identification information (vehicle ID) of the corresponding vehicle 10. The mobile terminal 30 may be a mobile terminal other than the smartphone.

The management center 500 includes a processor 510, a storage device 520, and a communication module 530. The communication module 530 is connected to the communication network NW by wire, for example. The storage device 520 stores a program to be executed by the processor 510 (for example, a program for executing a process shown in FIG. 3 described later).

The ECU 111 includes a processor 111*a* and a storage device 111*b*. The storage device 111*b* stores a program to be executed by the processor 111*a*. The ECU 111 controls in-vehicle equipment (drive device 116, etc.) according to a program. The ECU 111 is configured to measure a first degree of degradation of the battery 12 by a first method. A first method according to this embodiment is a method of measuring a first degree of degradation of the battery 12 based on data (battery data) of the battery 12 measured by the BMS 114 (first measuring device) mounted on the vehicle 10. In this embodiment, the first degree of degradation is represented by a capacity retention ratio. The first method will be described below.

The BMS 114 includes various sensors (for example, a current sensor, a voltage sensor, and a temperature sensor) for detecting the state of the battery 12, and sequentially outputs the detection results to the ECU 111. The ECU 111 stores the battery data acquired from the BMS 114 in the storage device 111*b*. Thus, data (history data) indicating the usage history of the battery 12 measured in a state of being mounted on the vehicle 10 is stored in the ECU 111. The storage device 111*b* stores in advance an initial capacity retention ratio of the battery 12 and conversion information M1 (e.g., formula, map, or model) determined according to characteristics of the battery 12. The conversion information M1 is configured to output a degree of degradation (for example, a capacity retention ratio) of the battery 12 at the end of the period when data (history data) indicating a usage history of the battery 12 in a certain period and a degree of degradation of the battery 12 at the start of the period are input.

The conversion information M1 converts the history data into a degradation progress (for example, a decrease amount of the capacity retention ratio) of the battery 12 due to use. The conversion information M1 outputs a value obtained by adding the degree of progress of degradation due to use to the degree of degradation at the start of use of the battery 12. The history data may include temperature data of the battery 12 during traveling of the vehicle 10 and temperature data of the battery 12 that is being left stand. When the temperature of the battery 12 deviates from the normal range, the battery 12 tends to be deteriorated. Further, the history data may include SOC data of the battery 12 of the vehicle 10 that is being left stand. The state of charge (SOC) represents a remaining amount of stored power, and it is expressed, for example, as a ratio of a current amount of stored power to an amount of stored power in a fully charged state that ranges from 0 to 100%. The longer the time during which the battery 12 is left in a state in which the remaining amount of electric power is large (for example, a state in which the SOC exceeds the degradation threshold), the more the battery 12 tends to be degraded. The history data may include data indicating the current, voltage, and SOC of the battery 12 during traveling of the vehicle 10. As the number of times of overcharging (for example, the charging power exceeds the charging endurance value, or the SOC exceeds the upper limit of the recommended range) of the battery 12 increases, the degradation of the battery 12 tends to proceed. Further, as the number of overdischarges of the battery 12 increases, the battery 12 tends to be deteriorated. Note that the conversion information (e.g., a map, a mathematical expression, or a model) may be prepared for each degradation parameter (temperature, high SOC leaving time, overcharge count, overdischarge count) of the battery 12.

According to the first method, the current degree of degradation (first degree of degradation) of the battery 12 can be acquired from the history data of the battery 12 using the conversion information M1. In response to a request from the management center 500, the ECU 111 measures the first degree of degradation by the first method, and transmits the measurement result (first degree of degradation) to the management center 500.

Further, the second degree of degradation of the battery 12 is measured by a second method with higher measurement accuracy than the first method. The second method according to this embodiment is a method of measuring the second degree of degradation of the battery 12 based on data of the battery 12 measured by the measuring devices 120 and 220 (second measuring devices) outside the vehicle 10. The measurement results obtained by the measuring devices 120 and 220 are transmitted to the servers 110 and 210, respectively, and are further transmitted from each server to the management center 500. The second method will be described below.

In the dealer 100, while the battery 12 is placed on the vehicle 10, the battery 12 is charged and discharged by the measuring device 120, and data during charging and discharging is analyzed. On the other hand, in the BSta 200, the battery 12 is detached from the vehicle 10, charge and discharge of the battery 12 (a single battery 12) in a state in which the battery 12 is detached from the vehicle 10 is performed by the measuring device 220, and data during charge and discharge is analyzed. The removed battery 12 is returned to the vehicle 10 after measurement. Each of the measuring devices 120, 220 includes various sensors to measure the state (e.g., temperature, current, and voltage) of the battery 12 during charging and discharging. For example, each measuring device discharges the battery 12 until an SOC value indicating an empty charge state is reached, and then charges the battery 12 until an SOC value indicating a full charge state is reached. Then, each measuring device measures the full charge capacity of the battery 12 from the measured data. The amount of electric power charged in the battery 12 from the empty state to the full charge state corresponds to the full charge capacity of the battery 12. Each measuring device may repeat charging and discharging of the battery 12 until it acquires necessary inspection data.

For the vehicle 10 visited by the dealer 100 and BSta 200, the full charge capacity of the battery 12 is measured by the measuring devices 120 and 220. The measurement result (full charge capacity) is transmitted from the servers 110 and 210 to the management center 500 together with the vehicle ID. The management center 500 calculates the capacity retention ratio (second degree of degradation) of the battery 12 by dividing the full charge capacity (current capacity) of the battery 12 received from the server 110 or 210 by the initial capacity. The initial capacity of the battery 12 is stored in the storage device 520 in association with the vehicle ID. As described above, the capacity retention ratio of the battery 12 is also obtained by the second method.

The storage device 520 further stores conversion information M2 (expression, map, model, etc.) for obtaining the lease fee of the battery 12 from the degree of degradation of the battery 12. In this embodiment, the lease fee of the battery 12 changes depending on the degree of degradation of the battery 12. The conversion information M2 defines a relationship in which the lease fee of the battery 12 decreases as the degree of degradation of the battery 12 increases. The management center 500 acquires the lease fee of the battery 12 commensurate with the degree of degradation (first or second degree of degradation) of the battery 12 in accordance with the relationship defined by the conversion information M2. The parameter indicating the degree of degradation of the power storage device is not limited to the capacity retention ratio (=current capacity/initial capacity). An internal resistance may be employed instead of the capacity retention rate. As the degree of degradation of the power storage device increases, the full charge capacity of the power storage device decreases and the internal resistance of the power storage device increases. The larger the degree of degradation of the power storage device, the lower the capacity retention ratio of the power storage device. The second measuring device may be built in EVSE (Electric Vehicle Supply Equipment) outside the vehicle.

In the first method described above, since the first degree of degradation of the power storage device is acquired using the first measuring device mounted on the vehicle 10, the first degree of degradation of the power storage device can be easily acquired at a high frequency (for example, always). On the other hand, in the second method described above, since the second degree of degradation of the power storage device is acquired using the second measuring device outside the vehicle 10, the second degree of degradation of the power storage device can be easily acquired with high accuracy. Since the second measuring device is not subject to restrictions (e.g., restrictions on dimensions, weight, power consumption, etc.) for mounting on the vehicle 10, it is easy to achieve high performance at low cost. However, since the second measuring device is not mounted on the vehicle 10, the measurement frequency is limited. Accordingly, the management center 500 executes the vehicle management method described below to selectively use the first method and the second method depending on the situation.

Figure 3:
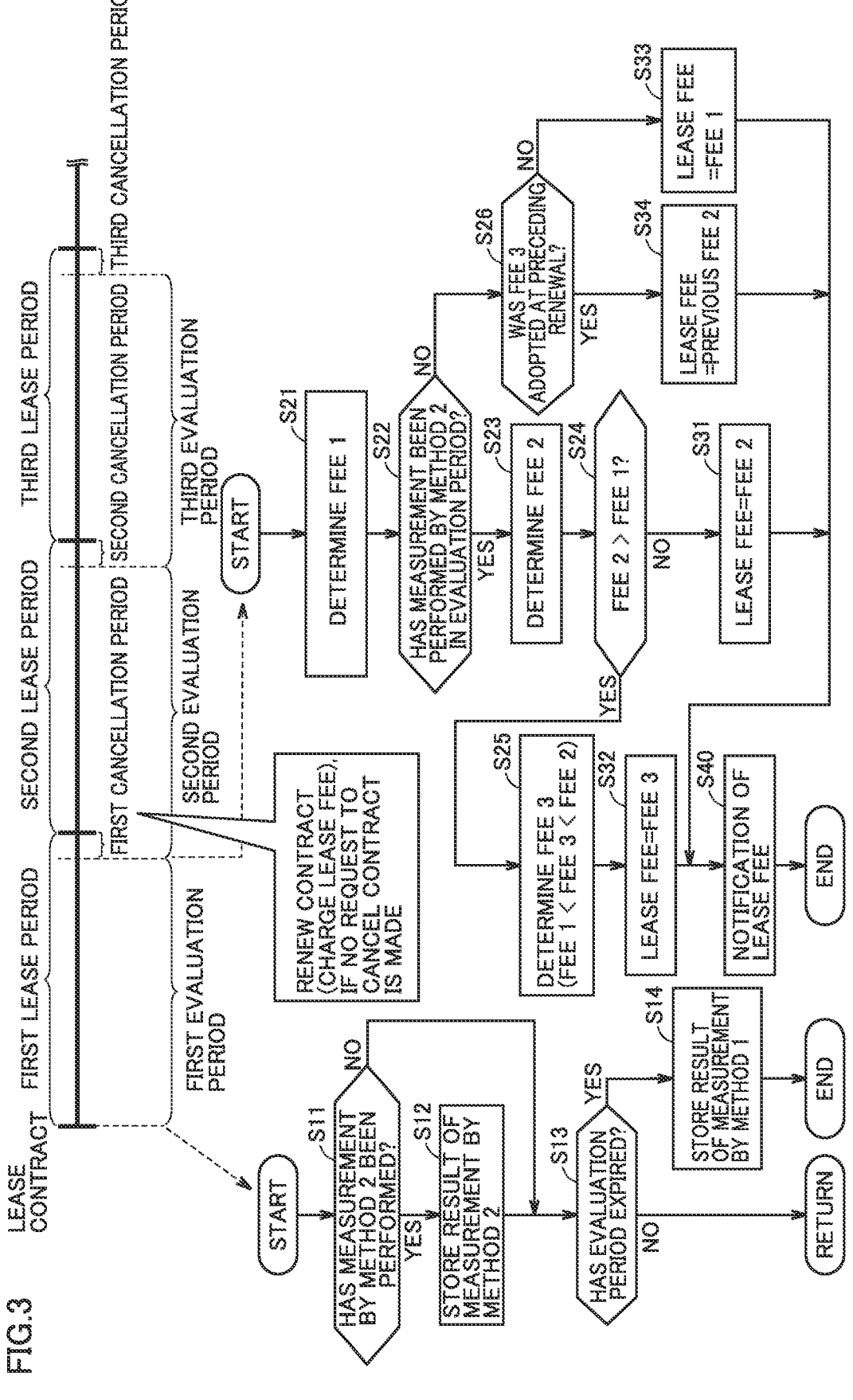
FIG. 3 is a diagram for explaining a vehicle management method according to the embodiment of the present disclosure.

FIG. 3 is a diagram for explaining a vehicle management method according to this embodiment. Referring to FIG. 3, a vehicle user having a lease contract with a lease provider (automobile manufacturer) can receive a lease service (e.g., partial lease or full lease) in a first unit period (a first lease period in FIG. 3). After that, the lease provider notifies the vehicle user of the lease fee for the next unit period (the second lease period in FIG. 3), and if the vehicle user does not cancel in the predetermined cancellation period (the first cancellation period), the lease contract is renewed. The cancellation period may be, for example, a period immediately before the next lease period (for example, a period from several days before the start of the next lease period to the current day). The vehicle user can receive the lease service in the next lease period (second lease period) by paying the notified lease fee. Similarly, in the subsequent lease periods (third lease period, fourth lease period, fifth lease period, . . . ), the lease fee is notified to the vehicle user at the timing of determining whether or not to renew the lease contract, and the lease contract is renewed or cancelled. In this embodiment, the length (unit period) of the lease period is one month. However, the length of this period can be changed as appropriate.

The management center 500 executes a series of processes of S11 to S14 described below in the evaluation period set before the next lease period. "S" in the flowchart means a step. In FIG. 3, the first evaluation period and the second evaluation period correspond to evaluation periods set for the second lease period and the third lease period, respectively. The first cancellation period and the second cancellation period correspond to a period for determining whether or not to fasten the lease contract for the second lease period and the third lease period, respectively. In this embodiment, the evaluation period is a period from the end of the immediately preceding evaluation period to the start of the cancellation period for the next lease period. However, the initial evaluation period (first evaluation period) is a period from the start of the initial lease period (first lease period) to the start of the first cancellation period.

Referring to FIG. 3 together with FIG. 1 and FIG. 2, in S11, the management center 500 determines whether or not the measurement according to the second method has been performed. More specifically, when the full charge capacity of the battery 12 is measured by the second measuring device (the measuring device 120 or 220 shown in FIG. 2) at a predetermined location (for example, dealer 100 or BSta 200) outside the vehicle 10, the measurement result (the full charge capacity) is transmitted to the management center 500 together with the identification information (the vehicle ID) of the vehicle 10. The management center 500 determines whether or not the measurement according to the second method has been performed based on whether or not the full charge capacity of the battery 12 has been received from the dealer 100 or BSta 200.

When it is determined that the measurement according to the second method has been performed (YES in S11), the management center 500 calculates the capacity retention ratio (second degree of degradation) of the battery 12 from the received measurement result (full charge capacity) in S12 and stores the obtained capacity retention ratio in the storage device 520 in association with the measurement time (current time) and the vehicle ID. Then, the process proceeds to S13. The capacity retention ratio stored in the storage device 520 by the processing of S12 corresponds to the second degree of degradation evaluated in the evaluation period by the second method.

On the other hand, when it is determined that the measurement according to the second method is not performed (NO in S11), S12 is skipped and the process proceeds to S13. In S13, the management center 500 determines whether or not the evaluation period has expired. The management center 500 according to the present embodiment determines whether or not the evaluation period has expired based on whether or not the cancellation period for the next lease period has arrived. When the evaluation period is the first evaluation period, the next lease period is the second lease period, and the period for cancellation is the first cancellation period. In this case, when the start time of the first cancellation period is reached, YES is determined in S13.

When it is determined that the evaluation period has not expired (NO in S13), the process returns to the first step (S11). Therefore, the series of processes of S11 to S13 is repeated while the evaluation period does not expire. On the other hand, when the evaluation period has expired (YES in S13), in S14, the management center 500 requests the measurement result of the first method to the vehicle 10, and stores the capacity maintenance ratio of the battery 12 obtained as the measurement result of the first method. When the vehicle 10 receives the request from the management center 500, the vehicle 10 acquires the capacity maintenance ratio of the battery 12 at the end of the evaluation period by inputting data (input data) to the conversion information M1, and transmits the capacity maintenance ratio to the management center 500 together with the identification information (vehicle ID) of the vehicle 10. The input data includes, for example, the capacity retention ratio of the battery 12 at the start of the evaluation period and history data of the battery 12 measured by the BMS 114 (first measuring device) during the evaluation period. The capacity retention ratio of the battery 12 at the end of the evaluation period thus obtained corresponds to the first degree of degradation evaluated in the evaluation period by the first method. The management center 500 stores the received capacity maintenance ratio of the battery 12 in the storage device 520 in association with the measurement time (current time) and the vehicle ID. When the processing of S14 is executed, the series of processing of S11 to S14 is terminated, and the series of processing following S21 is started. That is, a series of processing described below is started at the end time of the evaluation period (start time of the cancellation period).

In S21, the management center 500 determines a lease fee (first fee) for the battery 12 commensurate with the first degree of degradation (S14) evaluated in the evaluation period by the first method. Specifically, the management center 500 uses, for example, the conversion information M2 shown in FIG. 2 to determine a first fee from the first degree of degradation.

In S22, the management center 500 determines whether or not the measurement result (S12) according to the second method in the evaluation period has been acquired. When the measurement result of the second method in the evaluation period is stored in the storage device 520 (YES in S22), the management center 500 determines a lease fee (second fee) for the battery 12 commensurate with the second degree of degradation (S12) evaluated in the evaluation period by the second method in S23. Specifically, the management center 500 uses, for example, the conversion information M2 shown in FIG. 2 to obtain the second fee from the second degree of degradation.

Subsequently, in S24, the management center 500 determines whether or not the second fee is higher than the first fee. When the second fee is equal to or less than the first fee (NO in S24), the management center 500 determines the second fee as the lease fee for the next lease period in S31, and notifies the user terminal of the vehicle 10 (e.g., the vehicle-mounted HMI or the mobile terminal 30) of the determined lease fee (the second fee) in S40. As described above, when the second fee is lower than the first fee, the second fee is determined as the lease fee and is notified to the user.

When the second fee is higher than the first fee (YES in S24), the management center 500 obtains a third fee higher than the first fee and lower than the second fee in S25. The third fee may be an amount obtained by adding a value (for example, a value obtained by multiplying the difference between the first fee and the second fee by 0.5) obtained by multiplying the difference between the first fee and the second fee by a coefficient less than 1 to the first fee. Subsequently, the management center 500 determines the third fee acquired in S25 as the lease fee for the next lease period in S32, and notifies the user terminal of the vehicle 10 of the determined lease fee (third fee) in S40. As described above, when the second fee is higher than the first fee, the third fee is determined as the lease fee and is notified to the user.

When the measurement result of the second method in the evaluation period is not stored in the storage device 520 (NO in S22), the management center 500 determines whether or not the lease fee relating to the previous lease contract renewal (recent lease contract renewal) is the third fee in S26. When the lease fee relating to the previous lease contract renewal is not the third fee (NO in S26), the management center 500 determines the first fee as the lease fee for the next lease period in S33, and notifies the user terminal of the vehicle 10 of the determined lease fee (first fee) in S40. On the other hand, when the lease fee relating to the previous lease contract renewal is the third fee (YES in S26), the management center 500 determines the previous second fee (the second fee acquired at the time of the previous lease contract renewal) as the lease fee for the next lease period in S34, and notifies the user terminal of the vehicle 10 of the determined lease fee (the previous second fee) in S40.

For example, when the expired evaluation period is the second evaluation period and the cancellation period is the second cancellation period, the lease fee for the third lease period is determined in the current lease contract renewal. Therefore, the lease fee for the second lease period corresponds to the lease fee for the previous lease contract renewal. When the third fee is determined as the lease fee for the second lease period in S32 of the first cancellation period, YES is determined in S26 of the second cancellation period, and the previous second fee (the second fee acquired in S23 of the first cancellation period) is determined as the lease fee for the third lease period in S34 of the second cancellation period. On the other hand, when the third fee is not determined as the lease fee for the second lease period in the first cancellation period, NO is determined in S26 of the second cancellation period, and the current first fee (the first fee acquired in S21 of the second cancellation period) is determined as the lease fee for the third lease period in S33 of the second cancellation period.

When the management center 500 does not acquire the second degree of degradation evaluated in the first and second evaluation periods (the expired second evaluation period and before the second evaluation period), it is determined NO in both S22 and S26 of the first cancellation period, so that the first fee is determined as the lease fee for the second lease period in S33 of the first cancellation period. Further, NO is determined in both S22 and S26 of the second cancellation period, and the first fee is determined as the lease fee for the third lease period in S33 of the second cancellation period.

In S40, the management center 500 notifies the user terminal of the vehicle 10 of the determined lease fee (S31 to S34), and requests the vehicle user to return whether or not to cancel the lease contract. For the vehicle B (full lease vehicle), the vehicle user may be notified of the lease fee of the whole vehicle 10 including the lease fee of the battery 12. The management center 500 waits for a reply from a vehicle user, and executes a procedure for lease contract cancellation upon receipt of a reply of the cancellation within the cancellation period. Then, when the procedure of the cancellation is completed, the management center 500 notifies the user terminal of the vehicle 10 that the lease contract has been cancelled. In this case, the battery 12 lent by the vehicle manufacturer may be returned from the vehicle user to the dealer 100 or the BSta 200. On the other hand, in a case where a reply of the contract continuation is received within the cancellation period, or in a case where a reply is not received even after the cancellation period has elapsed, the management center 500 executes a contract renewal procedure for the lease contract continuation. When the procedure is completed, the management center 500 notifies the user terminal of the vehicle 10 that the lease contract is continued.

As described above, the vehicle management method according to this embodiment includes the processes shown in FIG. 3. These processes are executed by the management center 500. In this embodiment, the management center 500 corresponds to an example of a "server" according to the present disclosure. Each process is executed by one or more processors executing a program stored in one or more storage devices. However, these processes may be executed by dedicated hardware (electronic circuit) instead of software.

The vehicle management method according to this embodiment includes the following processes A to D. In the process A, the first degree of degradation of the power storage device (battery 12) of the vehicle 10 measured by the first method is acquired (S14). In the process B, when vehicle 10 visits the predetermined location (YES in S11), the second degree of degradation of the power storage device measured by the second method having higher measurement accuracy than the first method is acquired (S12). In the process C, the lease fee of the power storage device for the lease period is determined using the degree of degradation of the power storage device evaluated in the evaluation period set before the lease period. In the process D, the determined lease fee is notified to the user of the vehicle 10 (S40). The process C includes the following processes C-1 to C-4. In the process C-1, a first fee commensurate with the first degree of degradation evaluated in the evaluation period by the first method is obtained (S21). In the process C-2, when the second degree of degradation evaluated in the evaluation period is obtained by the second method, the second fee commensurate with the second degree of degradation is obtained (S23). In the process C-3, when the second fee is lower than the first fee, the second fee is determined as the lease fee for the lease period (S31). In the process C-4, when the evaluation period and the second degree of degradation evaluated before the evaluation period are not acquired, the first fee is determined as the lease fee for the lease period (S33). According to such a method, in a fee system for determining a lease fee using the degree of degradation of the power storage device, it is possible to suppress the user from notifying a lease fee higher than a lease fee commensurate with the actual degree of degradation.

Further, the process C includes, when the second fee is higher than the first fee, determining a third fee higher than the first fee and lower than the second fee as the lease fee for the lease period (S25, S32), and determining a second fee as the lease fee for the lease period after the lease period (S26, S34).

The second fee is closer to the fee commensurate with the actual degree of degradation than the first fee, and can be said to be a fairer fee. Therefore, the second fee is desirably adopted as the lease fee. However, in the above embodiment, since the frequency of measurement of the second degree of degradation is low, the first fee is basically adopted. If the second fee is employed immediately when the second degree of degradation is measured, a rapid fee change may occur. Accordingly, in the above method, when the second fee is higher than the first fee, a third fee higher than the first fee and lower than the second fee is determined as a lease fee for the lease period, and is notified to the user. Then, the second fee is determined as the lease fee for the lease period after the lease period, and is notified to the user. As described above, by sandwiching the third fee between the first fee and the second fee, even when the difference between the measurement accuracy of the first method and the measurement accuracy of the second method is large, the second fee can be easily accepted by the user.

Further, the process C includes the following processes C-5 to C-7. In the process C-5, when the second degree of degradation is not evaluated in the evaluation period for the lease period, it is determined whether or not the lease fee for the lease period immediately before the lease period is the third fee (S26). In the processing C-6, when the lease fee for the immediately preceding lease period is the third fee, the second fee commensurate with the second degree of degradation evaluated in the evaluation period for the immediately preceding lease period is determined as the lease fee for the lease period (S34). In the processing C-7, when the lease fee for the immediately preceding lease period is not the third fee, the first fee is determined as the lease fee for the lease period (S33). According to this method, the first fee, the second fee, and the third fee can be selectively used.

The processing flow shown in FIG. 3 can be changed as appropriate. For example, the order of the processes may be changed or unnecessary steps may be omitted depending on the purpose. Further, the contents of any one of the processes may be changed.

Figure 4:
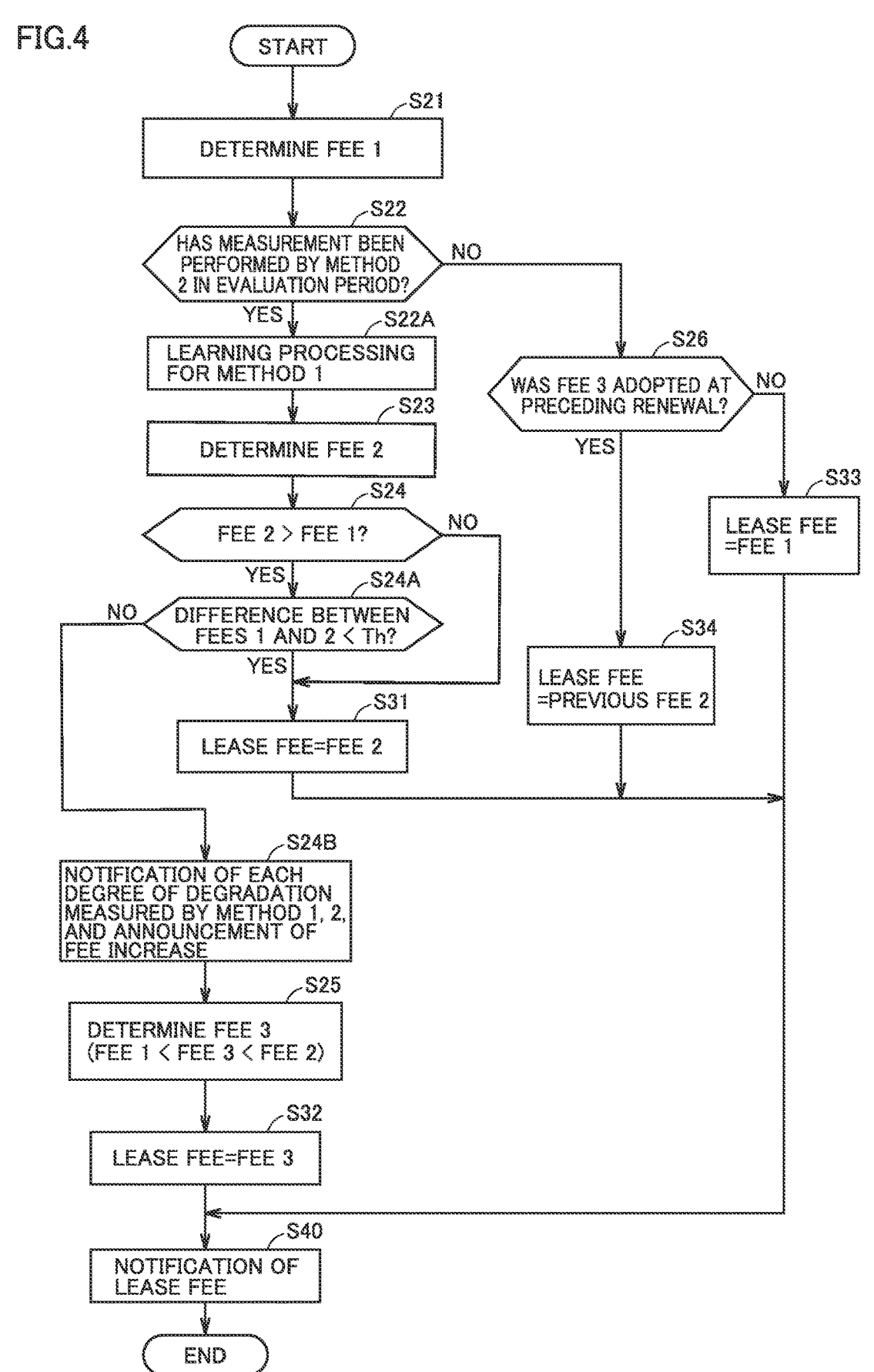
FIG. 4 is a flowchart showing a first modification of the processing shown in FIG. 3.

FIG. 4 is a flowchart showing a first modification of the processing shown in FIG. 3. The management center 500 may execute the processing shown in FIG. 4 described below instead of the processing shown in FIG. 3. In the processing shown in FIG. 4, S22A, S24A, and S24B are added to the processing shown in FIG. 3.

Referring to FIG. 4, in this modification, when it is determined in S22 that the measurement result according to the second method is acquired, management center 500 performs learning processing for the first method using the second degree of degradation (the measurement result according to the second method) in S22A. Specifically, the management center 500 transmits the second degree of degradation to the vehicle 10, and requests the ECU 111 to update information (e.g., conversion information M1) for the first method. The ECU 111 may perform supervised machine learning of the conversion information M1 using, for example, the second degree of degradation as supervised data.

When the second fee is higher than the first fee (YES in S24), the management center 500 determines whether or not the difference between the first fee and the second fee is smaller than a predetermined value (hereinafter referred to as "Th") in S24A. When the difference is smaller than Th (YES in S24A), the management center 500 determines the second fee as the lease fee for the next lease period in S31. On the other hand, when the difference is equal to or greater than Th (NO in S24A), the management center 500 notifies the user terminal (e.g., the vehicle-mounted HMI or the mobile terminal 30) of the vehicle 10 of information indicating the first and second degrees of degradation (e.g., the capacity maintenance ratios evaluated in each of the first and second methods) in S24B. Further, in S24B, the management center 500 notifies the user terminal of the vehicle 10 that the value is increased based on the degree of degradation (capacity maintenance ratio) evaluated by the second method. After that, the processing proceeds to S25.

In the vehicle management method (FIG. 4) according to the above modification, when the second fee is higher than the first fee and the difference between the first fee and the second fee is smaller than a predetermined value (Th), the second fee is determined as the lease fee for the lease period (S24, S24A, S31). When the second fee is higher than the first fee and the difference between the first fee and the second fee is larger than the predetermined value (Th), the second fee is determined as the lease fee for the lease period after the lease period (S24, S24A, S26, S34). In such a method, when the second fee is higher than the first fee and the difference between the first fee and the second fee is smaller than a predetermined value, a fairer second fee can be adopted as the lease fee for the lease period. On the other hand, when the second fee is higher than the first fee and the difference between the first fee and the second fee is larger than the predetermined value, the second fee is not immediately adopted, and adoption of the second fee is procrastinated. This makes it easier for the user to accept the second fee. Further, according to the above-described method, when adoption of the second fee is procrastinated, the increase of the lease fee is announced to the vehicle user (S24B). Such an announcement also makes it easier for the user to accept the second fee.

Figure 5:
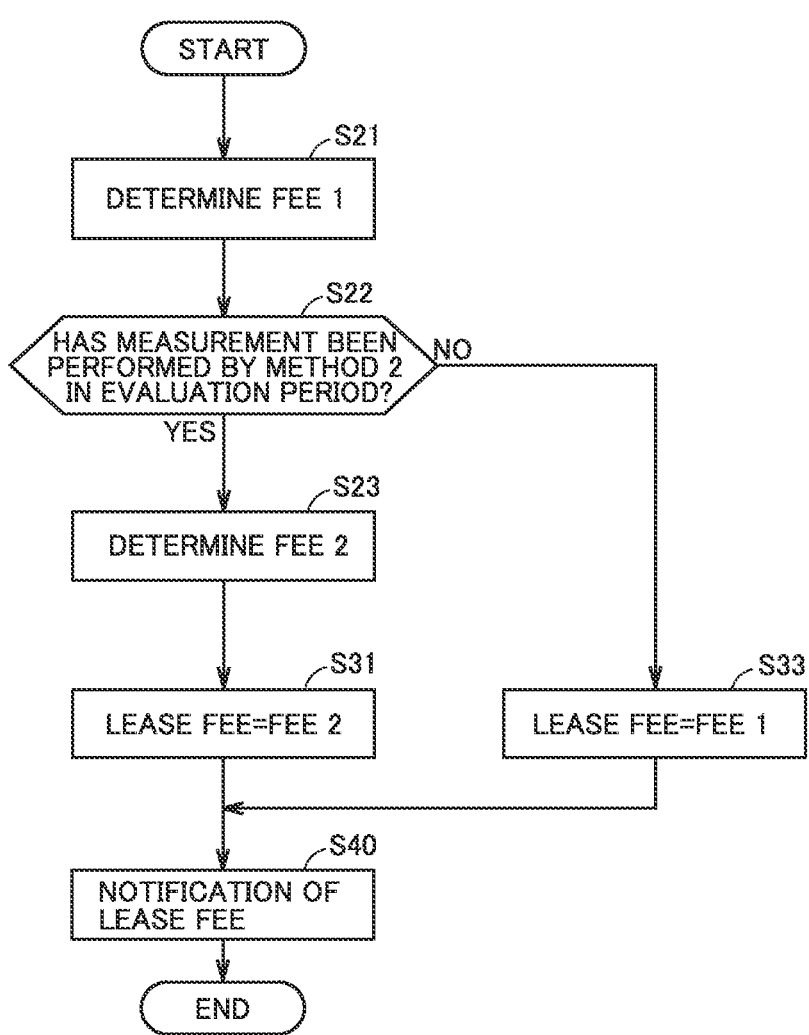
FIG. 5 is a flowchart showing a second modification of the processing shown in FIG. 3.

FIG. 5 is a flowchart showing a second modification of the processing shown in FIG. 3. The management center 500 may execute the processing shown in FIG. 5 described below instead of the processing shown in FIG. 3. In the processing shown in FIG. 5, steps S24 to S26 and steps S32 and S34 are omitted from the processing shown in FIG. 3. Referring to FIG. 5, in this modification, when the degree of degradation of battery 12 is not evaluated by the second method in the evaluation period (NO in S22), management center 500 determines the first fee as the lease fee for the next lease period (S33). On the other hand, when the degree of degradation of the battery 12 is evaluated by the second method in the evaluation period (YES in S22), the management center 500 determines the second fee as the lease fee for the next lease period regardless of the amount of the second fee (S31). According to such a method, in a fee system for determining a lease fee using the degree of degradation of the power storage device, it is easy to notify the user of a lease fee commensurate with the degree of degradation (the degree of degradation close to the actual degree of degradation) measured with high accuracy.

The management center 500 may be configured to measure the first degree of degradation of the power storage device mounted on the vehicle 10 by the first method. For example, the conversion information M1 may be installed in the management center 500, and battery data for measuring the first degree of degradation (history data related to degradation of the power storage device) may be transmitted from the vehicle 10 to the management center 500. In the above embodiment, the functions implemented in the management center 500 may be implemented in the server 110 (dealer terminal). In this embodiment, the management center 500, the server 110, and the server 210 are all on-premise servers. However, the functions of the servers may be implemented on the cloud by cloud computing.

The vehicle may be an HEV or a FCEV. The vehicle is not limited to a four-wheel passenger car, and may be a bus or a track, or may be an xEV having three wheels or five or more wheels. The vehicle may be capable of autonomous driving or include autonomous flying capabilities. The vehicle may be capable of unmanned driving (e.g., a robotaxi, an automatic guided vehicle (AGV), or an agricultural equipment).

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A system, comprising:
a first measuring device provided inside of a vehicle;
a second measuring device provided at a predetermined location outside of the vehicle; and
a server comprising a memory and at least one processor,
wherein the first measuring device is configured to measure a first degree of degradation of a power storage device of the vehicle via a first measurement method;
wherein the second measuring device is configured to measure a second degree of degradation of the power storage device of the vehicle via a second measurement method having a higher accuracy than the first measurement method; and
wherein the at least one processor of the server is configured to:
obtain the first degree of degradation of the power storage from the first measuring device;

obtain the second degree of degradation of the power storage device from the second measuring device;
set an evaluation period before a lease period;
determine, based on the first degree of degradation for the evaluation period being smaller than the second degree of degradation for the evaluation period, a lease condition for the power storage device in the lease period based on the second degree of degradation evaluated in the evaluation period;
determine, based on the first degree of degradation for the evaluation period being larger than the second degree of degradation for the evaluation period, the lease condition for the power storage device in the lease period based on both the first degree of degradation evaluated in the evaluation period and the second degree of degradation evaluated in the evaluation period; and
notify a user of the vehicle of the determined lease condition;
wherein the first measuring device is configured to:
detect a state of the power storage device of the vehicle, and
measure the first degree of degradation of the power storage device based on the detected state of the power storage device, and
wherein the second measuring device is configured to:
repeat charging and discharging of the power storage device to measure a full charge capacity, and
measure the second degree of degradation of the power storage device based on the full charge capacity.

2. The system according to claim 1, wherein the predetermined location includes one of a dealer and a battery replacement station,
when the second measuring device is a measuring device located in the dealer, the second measuring device is configured to repeat the charging and the discharging of the power storage device while the power storage device is placed on the vehicle, and
when the second measuring device is a measuring device provided in the battery replacement station, the second measuring device is configured to repeat the charging and discharging of the power storage device with the power storage device detached from the vehicle.

* * * * *